(12) United States Patent
Zhang et al.

(10) Patent No.: US 11,579,307 B2
(45) Date of Patent: Feb. 14, 2023

(54) METHOD AND APPARATUS FOR DETECTING OBSTACLE

(71) Applicant: Apollo Intelligent Driving Technology (Beijing) Co., Ltd., Beijing (CN)

(72) Inventors: Shuang Zhang, Beijing (CN); Xiang Liu, Beijing (CN); Bin Gao, Beijing (CN); Xiaoxing Zhu, Beijing (CN); Jingjing Xue, Beijing (CN); Fan Yang, Beijing (CN); Junping Wang, Beijing (CN); Chengfa Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 288 days.

(21) Appl. No.: 16/915,541

(22) Filed: Jun. 29, 2020

(65) Prior Publication Data
US 2021/0124054 A1 Apr. 29, 2021

(30) Foreign Application Priority Data
Oct. 25, 2019 (CN) .......................... 201911024230.0

(51) Int. Cl.
*G01S 17/931* (2020.01)
*G01S 7/48* (2006.01)
*G01S 17/89* (2020.01)

(52) U.S. Cl.
CPC .......... *G01S 17/931* (2020.01); *G01S 7/4808* (2013.01); *G01S 17/89* (2013.01)

(58) Field of Classification Search
CPC ........ G01S 17/931; G01S 17/89; G01S 17/87; G01S 7/4808; G01S 7/4802
See application file for complete search history.

(56) References Cited

U.S. PATENT DOCUMENTS

| | | | |
|---|---|---|---|
| 10,884,411 B1* | 1/2021 | Allais | ...................... G06N 3/08 |
| 11,022,693 B1* | 6/2021 | Allais | ...................... G05D 1/024 |
| 11,105,905 B2* | 8/2021 | Briggs | ...................... G06T 7/73 |

(Continued)

FOREIGN PATENT DOCUMENTS

| | | |
|---|---|---|
| CN | 109271944 A | 1/2019 |
| CN | 109558854 A | 4/2019 |

(Continued)

*Primary Examiner* — John W Miller
*Assistant Examiner* — Sean N. Haiem
(74) *Attorney, Agent, or Firm* — Seed IP Law Group LLP (57) ABSTRACT

Embodiments of the present disclosure provide a method and apparatus for detecting an obstacle. The method may include: acquiring first point cloud data collected by a first vehicle-mounted laser radar and second point cloud data collected by a second vehicle-mounted laser radar, where a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar; performing ground estimation based on the first point cloud data; filtering out a ground point in the second point cloud data according to the ground estimation result of the first point cloud data; and performing obstacle detection based on the second point cloud data after the ground point is filtered out.

12 Claims, 5 Drawing Sheets

(56) References Cited

U.S. PATENT DOCUMENTS

| | | | |
|---|---|---|---|
| 2018/0136332 A1* | 5/2018 | Barfield, Jr. | G01S 7/4802 |
| 2019/0156507 A1* | 5/2019 | Zeng | G06K 9/00 |
| 2019/0180467 A1* | 6/2019 | Li | G01S 17/931 |
| 2019/0226853 A1* | 7/2019 | Kubiak | G01S 7/4802 |
| 2020/0025935 A1* | 1/2020 | Liang | G01S 17/931 |
| 2020/0081105 A1* | 3/2020 | Zhou | G06T 7/60 |
| 2020/0134372 A1* | 4/2020 | Roy Chowdhury | G06K 9/6256 |
| 2020/0142067 A1* | 5/2020 | Wang | G01S 17/931 |
| 2020/0174107 A1* | 6/2020 | Briggs | H04N 5/247 |
| 2022/0100201 A1* | 3/2022 | Hara | G01C 21/3807 |

FOREIGN PATENT DOCUMENTS

| | | |
|---|---|---|
| CN | 110068836 A | 7/2019 |
| FR | 3 051 275 | 11/2017 |

* cited by examiner

METHOD AND APPARATUS FOR DETECTING OBSTACLE

CROSS-REFERENCE TO RELATED APPLICATIONS

This application claims priority to Chinese Patent Application No. 201911024230.0, filed on Oct. 25, 2019, titled "Method and apparatus for detecting obstacle," which is hereby incorporated by reference in its entirety.

TECHNICAL FIELD

Embodiments of the present disclosure relate to the field of computer technology, specifically to the field of autonomous driving technology, and particularly to a method and apparatus for detecting an obstacle.

BACKGROUND

In an autonomous driving scenario, a laser radar is usually used to perceive an obstacle on the road. A laser radar having a high number of wiring harnesses is usually mounted on a vehicle body for detecting the obstacle. The laser radar having the high number of wiring harnesses has a certain mounting height, and there is a certain angle between a laser wiring harness emitted from the laser radar and the ground. In this way, a detection blind zone is formed in an area close to the ground within a certain distance around the vehicle.

SUMMARY

Embodiments of the present disclosure provide a method and apparatus for detecting an obstacle, an electronic device, and a computer readable medium.

In a first aspect, an embodiment of the present disclosure provides a method for detecting an obstacle, including: acquiring first point cloud data collected by a first vehicle-mounted laser radar and second point cloud data collected by a second vehicle-mounted laser radar, where the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar; performing ground estimation based on the first point cloud data; filtering out a ground point in the second point cloud data according to the ground estimation result of the first point cloud data; and performing obstacle detection based on the second point cloud data after the ground point is filtered out.

In some embodiments, the performing ground estimation based on the first point cloud data includes: dividing the first point cloud data into a preset spatial grid, performing downsampling on the first point cloud data in each grid, and fitting a ground in the grid; and correcting the ground fitting result based on a difference between ground fitting results in grids and an angle between the ground fitted in each grid and a coordinate axis of a coordinate system where the first point cloud data is located, to obtain the ground estimation result of the first point cloud data.

In some embodiments, the filtering out a ground point in the second point cloud data according to the ground estimation result of the first point cloud data includes: calculating a distance between a data point in the second point cloud data and the ground estimated based on the first point cloud data, and ascertaining a data point, of which a distance from the ground estimated based on the first point cloud data is less than a preset distance threshold, in the second point cloud data as the ground point; and filtering out the ground point in the second point cloud data.

In some embodiments, the performing obstacle detection based on the second point cloud data after the ground point is filtered out includes: fusing the first point cloud data and the second point cloud data after the ground point is filtered out, to perform the obstacle detection.

In some embodiments, the second laser radar is a single-line laser radar.

In a second aspect, an embodiment of the present disclosure provides an apparatus for detecting an obstacle, including: an acquiring unit, configured to acquire first point cloud data collected by a first vehicle-mounted laser radar and second point cloud data collected by a second vehicle-mounted laser radar, wherein the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar; an estimating unit, configured to perform ground estimation based on the first point cloud data; a filtering-out unit, configured to filter out a ground point in the second point cloud data according to the ground estimation result of the first point cloud data; and a detecting unit, configured to perform obstacle detection based on the second point cloud data after the ground point is filtered out.

In some embodiments, the estimating unit is further configured to perform the ground estimation based on the first point cloud data by: dividing the first point cloud data into a preset spatial grid, performing downsampling on the first point cloud data in each grid, and fitting a ground in the grid; and correcting the ground fitting result based on a difference between ground fitting results in grids and an angle between the ground fitted in each grid and a coordinate axis of a coordinate system where the first point cloud data is located, to obtain the ground estimation result of the first point cloud data.

In some embodiments, the filtering-out unit is further configured to filter out the ground point in the second point cloud data according to the ground estimation result of the first point cloud data by: calculating a distance between a data point in the second point cloud data and the ground estimated based on the first point cloud data, and ascertaining a data point, of which a distance from the ground estimated based on the first point cloud data is less than a preset distance threshold, in the second point cloud data as the ground point; and filtering out the ground point in the second point cloud data.

In some embodiments, the detecting unit is further configured to perform the obstacle detection by: fusing the first point cloud data and the second point cloud data after the ground point is filtered out, to perform the obstacle detection.

In some embodiments, the second laser radar is a single-line laser radar.

In a third aspect, an embodiment of the present disclosure provides an electronic device, including: one or more processors; and a storage apparatus, configured to store one or more programs, where the one or more programs, when executed by the one or more processors, cause the one or more processors to implement the method in the first aspect.

In a fourth aspect, an embodiment of the present disclosure provides a computer readable medium, storing a computer program, where the program, when executed by a processor, implements the method in the first aspect.

According to the method for detecting an obstacle of the above embodiment of the present disclosure, the first point cloud data collected by the first vehicle-mounted laser radar and the second point cloud data collected by the second vehicle-mounted laser radar are acquired. Here, the first vehicle-mounted laser radar and the second vehicle-mounted laser radar are laser radars mounted on the given autonomous driving vehicle, the height of the first vehicle-mounted laser radar from the ground is greater than the height of the second vehicle-mounted laser radar from the ground, and the number of the wiring harnesses of the first vehicle-mounted laser radar is greater than the number of the wiring harnesses of the second vehicle-mounted laser radar. Then, the ground estimation is performed based on the first point cloud data. Next, the ground point in the second point cloud data is filtered out according to the ground estimation result of the first point cloud data. Finally, the obstacle detection is performed based on the second point cloud data after the ground point is filtered out. Accordingly, the obstacle auxiliary perception of the laser radar having the high number of wiring harnesses to the laser radar having the low number of wiring harnesses is realized, and thus, the obstacle can be more comprehensively and accurately detected. The false detection for the obstacle caused by the vibration of the vehicle body or the mounting accuracy of the laser radar having the low number of wiring harnesses may also be reduced.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining accompanying drawings and embodiments. It may be appreciated that the specific embodiments described herein are merely used for explaining the relevant disclosure, rather than limiting the disclosure.

In addition, it should be noted that, for ease of description, only parts related to the relevant disclosure are shown in the accompanying drawings.

It should also be noted that embodiments in the present disclosure and features in the embodiments may be combined with each other on a non-conflict basis. The present disclosure will be described below in detail with reference to the accompanying drawings and in combination with the embodiments.

Figure 1:
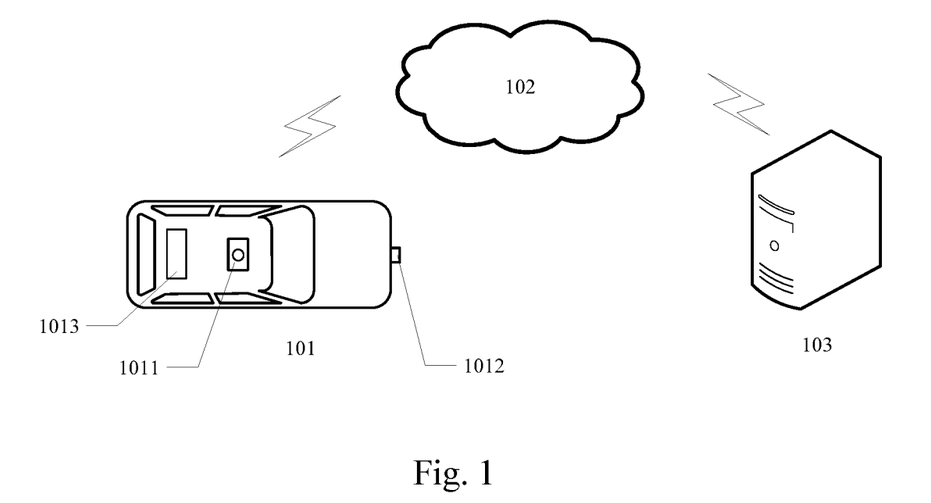
FIG. 1 is a diagram of an example system architecture in which an embodiment of the present disclosure may be applied.

FIG. 1 illustrates an example system architecture 100 in which a method for detecting an obstacle or an apparatus for detecting an obstacle according to embodiments of the present disclosure may be applied.

As shown in FIG. 1, the system architecture 100 may include an autonomous driving vehicle 101, a network 102, and a server 103. The network 102 serves as a medium providing a communication link between the autonomous driving vehicle 101 and the server 103. The network 102 may include various types of connections, for example, wired or wireless communication links, or optical fiber cables The autonomous driving vehicle 101 may be provided with at least two laser radars 1011 and 1012 for collecting point cloud data of a surrounding environment of the autonomous driving vehicle. The autonomous driving vehicle 101 may also be provided with a processing unit 1013 for processing data perceived by the autonomous driving vehicle 101, making a driving decision, and the like.

The autonomous driving vehicle 101 may interact with the server 103 via the network 102 to send data to or receive data from the server 103. The server 103 may be a server that provides backend support for the autonomous driving vehicle 101, may perform analysis processing on the environmental data perceived by the autonomous driving vehicle 101, and feedback the processing result to the autonomous driving vehicle.

In an application scenario of an embodiment of the present disclosure, the autonomous driving vehicle 101 may send the point cloud data collected by the laser radars 1011 and 1012 to the server 103 through the processing unit 1013. The server 103 may perform obstacle detection and obstacle recognition according to the received point cloud data, and return the detection result and the recognition result to the autonomous driving vehicle 101. The autonomous driving vehicle 101 makes a driving decision according to the obstacle detection result and the obstacle recognition result. Alternatively, the server 103 may also make a driving decision according to the obstacle detection result and the obstacle recognition result, and feedback a decision instruction to the autonomous driving vehicle 101.

It should be noted that the server 103 may be hardware or software. When the server 103 is the hardware, the server 103 may be implemented as a distributed server cluster composed of a plurality of servers, or may be implemented as a single server. When the server 103 is the software, the server 103 may be implemented as a plurality of pieces of software or a plurality of software modules (e.g., software or software modules for providing a distributed service), or may be implemented as a single piece of software or a single software module, which will not be specifically defined here.

It should be noted that the method for detecting an obstacle provided in the embodiments of the present disclosure may be performed by the server 103.

Correspondingly, the apparatus for detecting an obstacle may be provided in the server 103.

Alternatively, the method for detecting an obstacle provided in the embodiments of the present disclosure may also be performed by the processing unit 1013 on the autonomous driving vehicle 101. Correspondingly, the apparatus for detecting an obstacle may be provided in the processing unit 1013 on the autonomous driving vehicle 101.

It should be appreciated that the numbers of the autonomous driving vehicles, the networks, the servers, the laser radars and the processing units in FIG. 1 are merely illustrative. Any number of autonomous driving vehicles, networks, servers, laser radars and processing units may be provided based on actual requirements.

Figure 2:
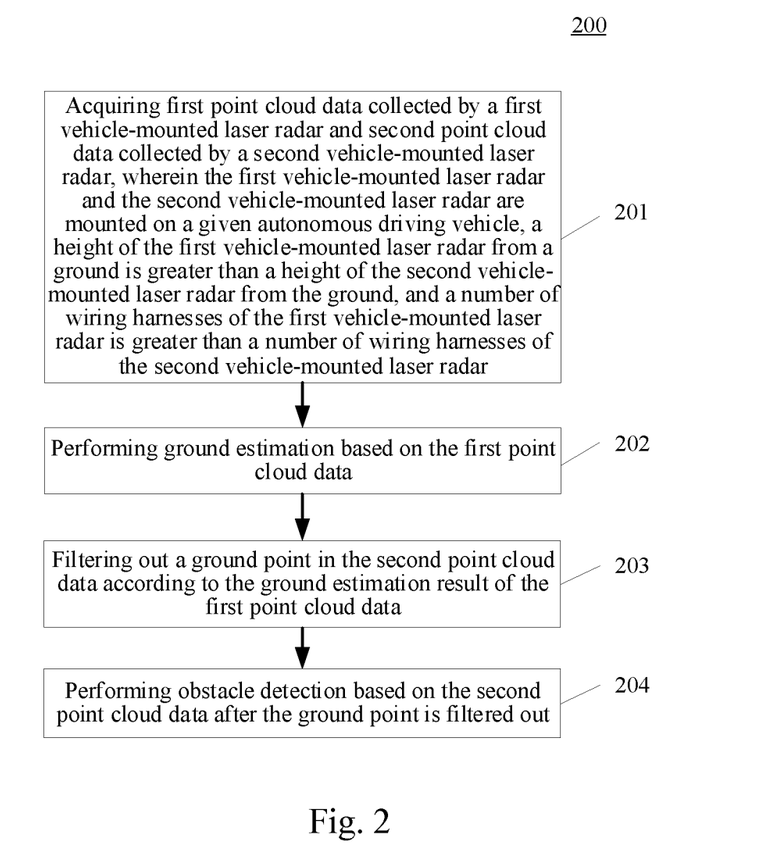
FIG. 2 is a flowchart of a method for detecting an obstacle according to an embodiment of the present disclosure.

Further referring to FIG. 2, FIG. 2 illustrates a flow 200 of a method for detecting an obstacle according to an embodiment of the present disclosure. The method for detecting an obstacle includes the following steps.

Step 201, acquiring first point cloud data collected by a first vehicle-mounted laser radar and second point cloud data collected by a second vehicle-mounted laser radar.

The first vehicle-mounted laser radar and the second vehicle-mounted laser radar are laser radars mounted at different positions of a given autonomous driving vehicle. A height of the first vehicle-mounted laser radar from the ground is greater than a height of the second vehicle-mounted laser radar from the ground, and a number of wiring harnesses of the first vehicle-mounted laser radar is greater than a number of wiring harnesses of the second vehicle-mounted laser radar. That is, the first vehicle-mounted laser radar may be a laser radar having a high number of wiring harnesses, for example, a 16-line laser radar or a 64-line laser radar. The second vehicle-mounted laser radar may be a laser radar having a low number of wiring harnesses, for example, a single-line laser radar or a 4-line laser radar.

In this embodiment, the mounting height of the first vehicle-mounted laser radar is greater than the mounting height of the second vehicle-mounted laser radar. In practice, there is a certain angle between the laser wiring harness of the first vehicle-mounted laser radar and the ground, for example, the maximum angle between the laser wiring harness of the 16-line laser radar and the ground is 15°. The mounting height of the second vehicle-mounted laser radar is lower than the mounting height of the first vehicle-mounted laser radar, and the second vehicle-mounted laser radar is used to perceive an obstacle within a low area in front of the vehicle.

When the second vehicle-mounted laser radar is a non-single-line laser radar (e.g., is the 4-line laser radar), a laser wiring harness of the second vehicle-mounted laser radar also forms a reflection on the ground, and thus, the point cloud data collected by the second vehicle-mounted laser radar includes a ground point.

When the second vehicle-mounted laser radar is the single-line laser radar, ideally, the laser wiring harness of the single-line laser radar is parallel to the ground. However, since there may be some errors in the mounting angle, there may be a certain angle of depression between the wiring harness of the single-line laser radar and the ground. However, the mounting position of the single-line laser radar is close to the ground, and the wiring harness of the single-line laser radar may be hit on the ground when the vehicle vibrates during driving. Thus, the point cloud data collected by the single-line laser radar may also include a ground point.

The above first point cloud data and the above second point cloud data may be point cloud data collected at the same position by the first vehicle-mounted laser radar and the second vehicle-mounted laser radar of the autonomous driving vehicle, for example, point cloud data respectively collected by the first vehicle-mounted laser radar and the second vehicle-mounted laser radar at the same time.

In this embodiment, the executing body may acquire the first point cloud data and the second point cloud data by connecting with the first vehicle-mounted laser radar and the second vehicle-mounted laser radar. Alternatively, the above executing body may respectively acquire the first point cloud data and the second point cloud data from the data collected by a vehicle-mounted laser radar and stored in the storage unit of the autonomous driving vehicle.

Step 202, performing ground estimation based on the first point cloud data.

In this embodiment, the ground in the road environment may be estimated based on the first point cloud data. Specifically, a RANSAC (Random Sample Consensus) algorithm may be used to perform plane detection, to estimate the ground in the road environment in combination with an absolute height of each data point in the first point cloud data.

In some alternative implementations of this embodiment, the first point cloud data may be divided into a preset spatial grid, downsampling is performed on the first point cloud data in each grid, and the ground is fitted in the grid. Then, the ground fitting result is corrected based on a difference between ground fitting results in grids and an angle between the ground fitted in each grid and a coordinate axis of a coordinate system where the first point cloud data is located, to obtain the ground estimation result of the first point cloud data.

Here, the detection range of the first laser radar may be divided into a plurality of preset spatial grids, and the ground estimation is performed on each grid. Specifically, the downsampling is performed in the each grid according to the distribution of a point cloud in a vertical direction. Then, the ground estimation is performed on a data point obtained by downsampling. Next, for each data point in the grid, the distance between the data point and the estimated ground is calculated. If the distance is less than a threshold, the data point is used as a new ground point, and the ground fitting result of the grid is updated based on the new ground point. After the ground fitting result is updated based on the each data point in the grid, the angle between grounds in adjacent grids may be calculated, and the cosine value of the angle may be used to measure the difference between the ground fitting results of the adjacent grids. If the angle is smaller than a preset angle, the angle between the grounds of the adjacent grids is smoothed, and then, the ground fitted by the plurality of grids is updated. Until all the grids are calculated and the ground tends to be smooth, the updating for the ground fitting result is stopped. At this point, whether the ground fitting result is parallel to the vertical axis (z axis) in the coordinate system where the first point cloud data is located may be determined. If the relative angle between the ground fitting result and the vertical axis (z axis) in the coordinate system where the first point cloud data is located is less than a preset angle range (e.g., less than 5°), the ground fitting result may be used as the ground estimation result of a first point cloud, otherwise, the ground fitting result may be corrected based on the above ground fitting result obtained through the updating, so that the relative angle between the ground fitting result and the vertical axis in the coordinate system where the first point cloud data is located is reduced to be within the preset angle range.

Step 203, filtering out a ground point in the second point cloud data according to the ground estimation result of the first point cloud data.

After the ground is estimated based on the first point cloud data, whether each point in the second point cloud data is a ground point may be determined. Specifically, a point in the second point cloud data that falls on the plane of the estimated ground may be used as the ground.

Alternatively, in some alternative implementations, a distance between a data point in the second point cloud data and the ground estimated based on the first point cloud data may be calculated, and a data point, of which a vertical distance from the ground estimated based on the first point cloud data is less than a preset distance threshold, in the second point cloud data may be ascertained as the ground point. Then, the ground point in the second point cloud data may be filtered out.

Spatial coordinate systems used by data points in the above first point cloud data and the above second point cloud data are identical. Since the first point cloud data is collected by the laser radar having the high number of wiring harnesses and the density of data points is high, the ground estimated based on the first point cloud data is accurate. The ground estimated based on the first point cloud data is used as a ground reference plane, and thus, the ground point in the second point cloud data may be filtered out more accurately.

Step 204, performing obstacle detection based on the second point cloud data after the ground point is filtered out.

An obstacle within the detection range of the second laser radar may be detected based on the second point cloud data after the ground point is filtered out.

Specifically, the second point cloud data after the ground point is filtered out may be segmented and clustered to obtain a plurality of point clouds to be matched with the obstacle. Then, the point clouds to be matched with the obstacle are matched based on characteristics (such as a shape and a size) of each obstacle in a preset obstacle database, so as to recognize the type of the obstacle.

In this embodiment, the mounting position of the second vehicle-mounted laser radar is low, and the number of the wiring harnesses is small. Thus, the detection range of the second vehicle-mounted laser radar is small. An obstacle (e.g., a protrusion on a road and a falling rock) at a low position in an area close to the vehicle may be detected using the second vehicle-mounted laser radar. The above preset obstacle database for performing matching on the second point cloud data may be constructed based on a common low obstacle.

When the vehicle body vibrates and there is an error in the mounting of the second laser radar, some ground points in the second point cloud data may be mistakenly detected as obstacle points. In this embodiment, by filtering the ground points from the second point cloud data, the false detection rate that the ground points are mistakenly determined as the obstacle points can be reduced, thereby improving the detection accuracy.

Alternatively, for an obstacle (e.g., a pedestrian having a high height, a vehicle and a road shoulder) within the detection range of the first vehicle-mounted laser radar, the obstacle detection may be performed based on the first point cloud data. Further alternatively, the obstacle may also be recognized by combining the first point cloud data and the second point cloud data after the ground point is filtered out. For example, when it is detected, based on the second point cloud data after the ground point is filtered out, that an obstacle exists at the distance L in front of the vehicle and at the same time, it is detected, based on the first point cloud data, that the obstacle exists at the distance L in front of the vehicle, the heights of the obstacles may be calculated based on the first point cloud data, and the types of the obstacles may be obtained by matching a characteristic. Then, whether the obstacle detected based on the second point cloud data after the ground point is filtered out and the obstacle detected based on the first point cloud data are the same obstacle.

According to the method for detecting an obstacle of the above embodiment of the present disclosure, the first point cloud data collected by the first vehicle-mounted laser radar and the second point cloud data collected by the second vehicle-mounted laser radar are acquired. Here, the first vehicle-mounted laser radar and the second vehicle-mounted laser radar are laser radars mounted on the given autonomous driving vehicle, the height of the first vehicle-mounted laser radar from the ground is greater than the height of the second vehicle-mounted laser radar from the ground, and the number of the wiring harnesses of the first vehicle-mounted laser radar is greater than the number of the wiring harnesses of the second vehicle-mounted laser radar. Then, the ground estimation is performed based on the first point cloud data. Next, the ground point in the second point cloud data is filtered out according to the ground estimation result of the first point cloud data. Finally, the obstacle detection is performed based on the second point cloud data after the ground point is filtered out. Accordingly, the obstacle auxiliary perception of the laser radar having the high number of wiring harnesses to the laser radar having the low number of wiring harnesses is realized, and thus, the obstacle can be more comprehensively and accurately detected. The false detection for the obstacle caused by the vibration of the vehicle body or the mounting accuracy of the laser radar having the low number of wiring harnesses may also be reduced.

Figure 3:
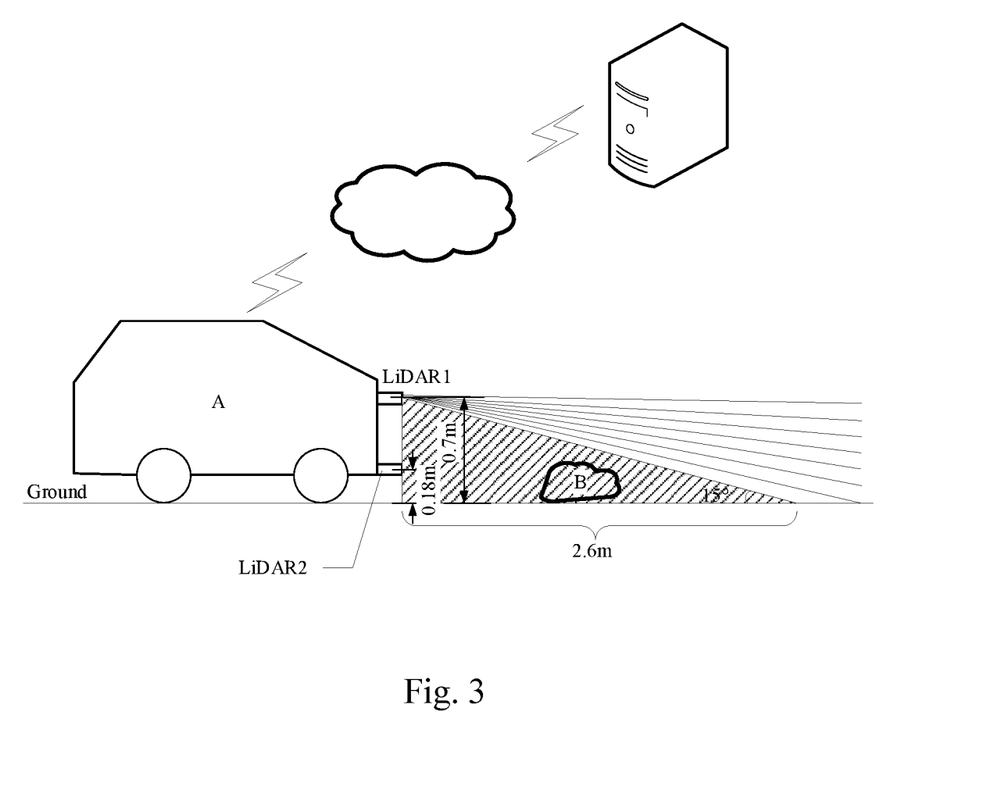
FIG. 3 is a schematic diagram of an application scenario of the method for detecting an obstacle according to an embodiment of the present disclosure.

Referring to FIG. 3, FIG. 3 is a schematic diagram of an example application scenario of the method for detecting an obstacle according to an embodiment of the present disclosure. As shown in FIG. 3, a first vehicle-mounted laser radar LiDAR1 of an autonomous driving vehicle A is mounted at a height of about 0.7 meter of the vehicle body from the ground, and a second vehicle-mounted laser radar LiDAR2 is mounted at a height of about 0.18 meter of the vehicle chassis from the ground. The first vehicle-mounted laser radar is a 16-line laser radar, and the angle between the wiring harness closest to the vehicle A and the ground is 15° among the intersections of all the wiring harnesses emitted by the radar and the ground. It may be calculated that the distance of the detection blind zone of the first vehicle-mounted laser radar LiDAR1 near the ground in front of the vehicle is about 2.6 meters (the shaded area shown in FIG. 3 is the detection blind zone of the first vehicle-mounted laser radar). The second vehicle-mounted laser radar LiDAR2 may be a single-line laser radar, and the laser beams emitted by the second vehicle-mounted laser radar LiDAR2 is approximately parallel to the ground, and thus, auxiliary detection may be performed on the detection blind zone of the first vehicle-mounted laser radar LiDAR1.

The first vehicle-mounted laser radar LiDAR1 and the second vehicle-mounted laser radar LiDAR2 of the autonomous driving vehicle A may work together. When the autonomous driving vehicle A is driving or stops driving, the two laser radars may collect three-dimensional point cloud data of the surrounding environment of the vehicle, and then transmit the collected point cloud data to a backend server, respectively. The backend server may first estimate the ground based on the point cloud data collected by the first vehicle-mounted laser radar LiDAR1, then filter out a ground point from the point cloud data collected at the same geographic position by the second vehicle-mounted laser radar LiDAR2 based on the estimated ground. Next, the server may perform clustering and matching based on other point clouds after the second vehicle-mounted laser radar LiDAR2 filters out the ground point, thereby recognizing an obstacle B within the detection blind zone of the first vehicle-mounted laser radar LiDAR1.

Figure 4:
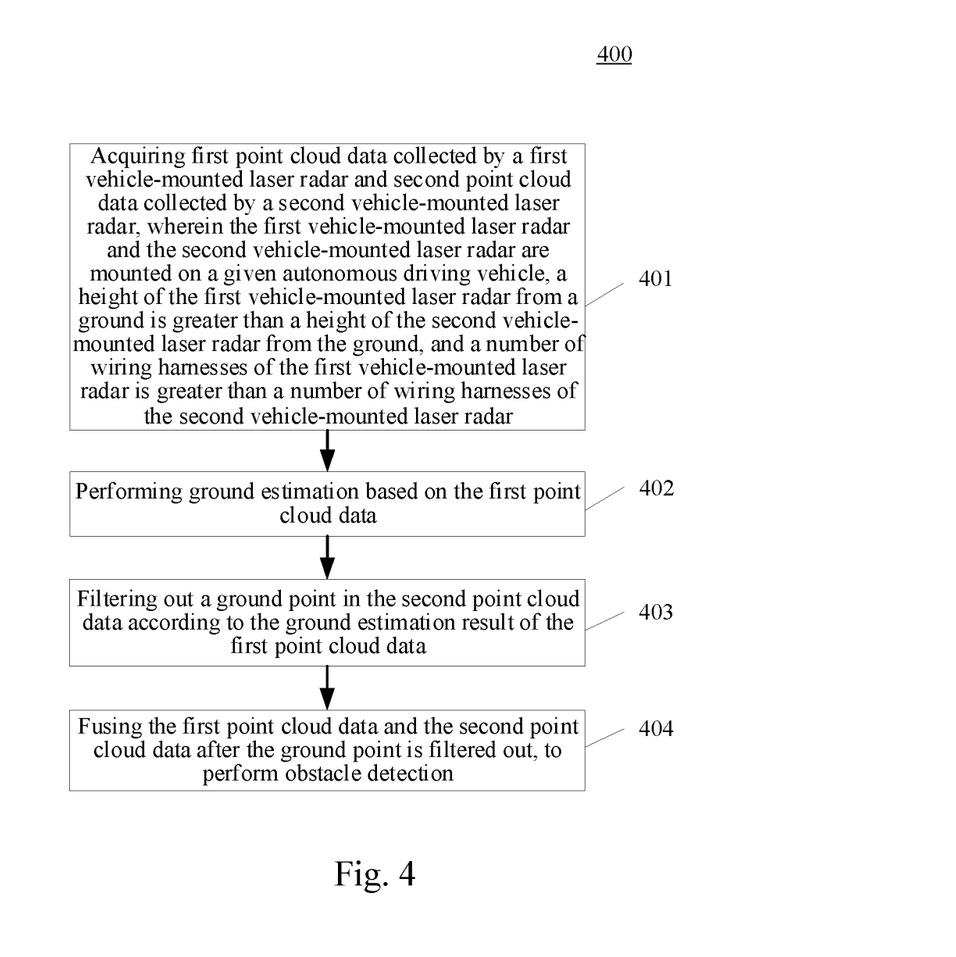
FIG. 4 is a flowchart of the method for detecting an obstacle according to another embodiment of the present disclosure.

Further referring to FIG. 4, FIG. 4 is a flowchart of the method for detecting an obstacle according to another embodiment of the present disclosure. As shown in FIG. 4, a flow 400 of the method for detecting an obstacle in this embodiment includes the following steps.

Step 401, acquiring first point cloud data collected by a first vehicle-mounted laser radar and second point cloud data collected by a second vehicle-mounted laser radar.

Here, the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar.

Step 402, performing ground estimation based on the first point cloud data.

Step 403, filtering out a ground point in the second point cloud data according to the ground estimation result of the first point cloud data.

Steps 401, 402 and 403 in this embodiment are consistent with steps 201, 202 and 203 in the foregoing embodiment, respectively. For specific implementations of steps 401, 402 and 403, reference may be made to the descriptions for steps 201, 202 and 203 in the foregoing embodiment, respectively, which will not be repeatedly described here.

Step 404, fusing the first point cloud data and the second point cloud data after the ground point is filtered out, to perform obstacle detection.

In this embodiment, calibration data of the first vehicle-mounted laser radar and the second vehicle-mounted laser radar may be acquired. If the laser point cloud data collected by the first vehicle-mounted laser radar and the laser point cloud data collected by the second vehicle-mounted laser radar use the same coordinate system, the first point cloud data may be directly fused with the second point cloud data after the ground point is filtered out. If the first vehicle-mounted laser radar and the second vehicle-mounted laser radar use different coordinate systems, a position calibration parameter of the first vehicle-mounted laser radar with respect to an inertial navigation system and a position calibration parameter of the second vehicle-mounted laser radar with respect to the inertial navigation system may be respectively acquired. Then, a coordinate system conversion is performed, and the first point cloud data and the second point cloud data are converted to the inertial navigation system coordinate system, and then the fusion is performed. Alternatively, one of the first point cloud data and the second point cloud data is converted into the coordinate system of the other one, and then the fusion is performed.

The obstacle may then be detected based on the fused point cloud data. Specifically, the spatial position of the obstacle, the position of the obstacle relative to the autonomous driving vehicle, the moving track and speed of the obstacle may be detected by performing clustering, area segmentation, characteristic matching, etc. on the fused point cloud data, and the type of the obstacle may also be recognized.

In this embodiment, by fusing the point cloud data of the vehicle-mounted laser radar having the high number of wiring harnesses and the point cloud data of the vehicle-mounted laser radar having the low number of wiring harnesses after the ground point is filtered out, repeated detection for the obstacle can be further avoided, thus improving the efficiency of detecting the obstacle.

Figure 5:
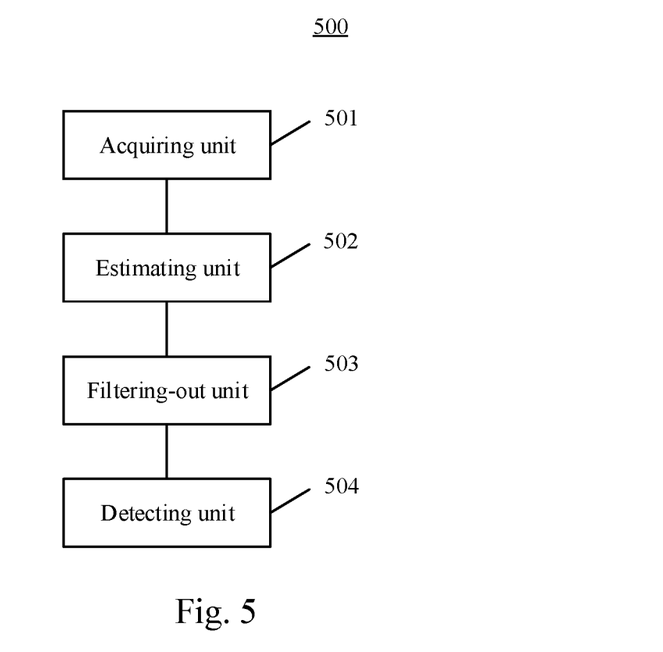
FIG. 5 is a schematic structural diagram of an apparatus for detecting an obstacle according to an embodiment of the present disclosure.

Further referring to FIG. 5, as an implementation of the above method for detecting an obstacle, an embodiment of the present disclosure provides an apparatus for detecting an obstacle. The embodiment of the apparatus corresponds to the embodiments of the method shown in FIGS. 2 and 4, and the apparatus may be applied in various electronic devices.

As shown in FIG. 5, the apparatus 500 for detecting an obstacle in this embodiment includes an acquiring unit 501, an estimating unit 502, a filtering-out unit 503 and a detecting unit 504. Here, the acquiring unit 501 is configured to acquire first point cloud data collected by a first vehicle-mounted laser radar and second point cloud data collected by a second vehicle-mounted laser radar. Here, the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar. The estimating unit 502 is configured to perform ground estimation based on the first point cloud data. The filtering-out unit 503 is configured to filter out a ground point in the second point cloud data according to the ground estimation result of the first point cloud data. The detecting unit 504 is configured to perform obstacle detection based on the second point cloud data after the ground point is filtered out.

In some embodiments, the above estimating unit 502 may be further configured to perform the ground estimation based on the first point cloud data by: dividing the first point cloud data into a preset spatial grid, performing downsampling on the first point cloud data in each grid, and fitting a ground in the grid; and correcting the ground fitting result based on a difference between ground fitting results in grids and an angle between the ground fitted in each grid and a coordinate axis of a coordinate system where the first point cloud data is located, to obtain the ground estimation result of the first point cloud data.

In some embodiments, the above filtering-out unit 503 may be further configured to filter out the ground point in the second point cloud data according to the ground estimation result of the first point cloud data by: calculating a distance between a data point in the second point cloud data and the ground estimated based on the first point cloud data, and ascertaining a data point, of which a distance from the ground estimated based on the first point cloud data is less than a preset distance threshold, in the second point cloud data as the ground point; and filtering out the ground point in the second point cloud data.

In some embodiments, the above detecting unit 504 may be further configured to perform the obstacle detection by: fusing the first point cloud data and the second point cloud data after the ground point is filtered out, to perform the obstacle detection.

In some embodiments, the above second laser radar is a single-line laser radar.

It should be understood that the units recited in the apparatus 500 correspond to the steps in the method described with reference to FIGS. 2 and 4. Therefore, the operations and features described above for the method for detecting an obstacle are also applicable to the apparatus 500 and the units included therein, which will not be repeatedly described here.

According to the apparatus 500 for detecting an obstacle of the above embodiment of the present disclosure, the acquiring unit acquires the first point cloud data collected by the first vehicle-mounted laser radar and the second point cloud data collected by the second vehicle-mounted laser radar. Here, the height of the first vehicle-mounted laser radar from the ground is greater than the height of the second vehicle-mounted laser radar from the ground, and the number of the wiring harnesses of the first vehicle-mounted laser radar is greater than the number of the wiring harnesses of the second vehicle-mounted laser radar. Then, the estimating unit performs the ground estimation based on the first point cloud data. Next, the filtering-out unit filters out the ground point in the second point cloud data according to the ground estimation result of the first point cloud data. Finally, the detecting unit performs the obstacle detection based on the second point cloud data after the ground point is filtered out. Accordingly, the obstacle auxiliary perception of the laser radar having the high number of wiring harnesses to the laser radar having the low number of wiring harnesses is realized, which helps to reduce the false detection for the obstacle caused by the vibration of the vehicle body or the mounting accuracy of the laser radar having the low number of wiring harnesses.

Figure 6:
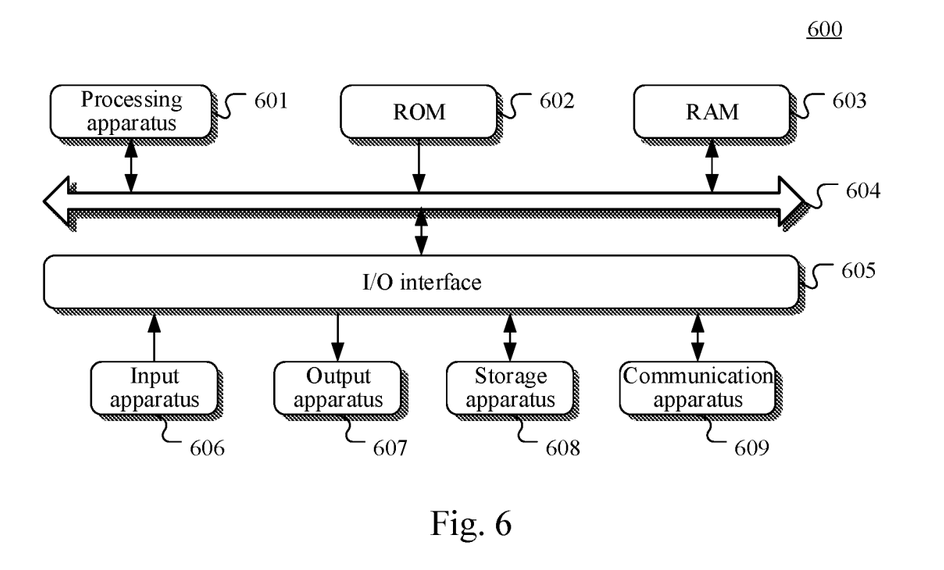
FIG. 6 is a schematic structural diagram of a computer system adapted to implement an electronic device according to embodiments of the present disclosure.

Referring to FIG. 6, FIG. 6 is a schematic structural diagram of an electronic device (such as the server as shown in FIG. 1) 600 of a terminal adapted to implement embodiments of the present disclosure. The electronic device 600 shown in FIG. 6 is merely an example, and should not bring any limitations to the functions and the scope of use of the embodiments of the present disclosure.

As shown in FIG. 6, the computer system 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The processing apparatus 601, the ROM 602 and the RAM 603 are connected to each other through a bus 604. An input/output (I/O) interface 605 is also connected to the bus 604.

Generally, the following apparatuses are connected to the I/O interface 605: an input apparatus 606 including, for example, a touch screen, a touch pad, a keyboard, and a mouse, a camera, a microphone, an accelerometer and a gyroscope; an output apparatus 607 including, for example, a liquid crystal display (LCD), a speaker and a vibrator; the storage apparatus 608 including, for example, a hard disk; and a communication apparatus 609. The communication apparatus 609 may allow the electronic device 600 to exchange data with other devices by means of a wireless communication or wired communication. Although FIG. 6 illustrates the electronic device 600 having various apparatuses, it should be understood that it is not required to implement or possess all of the shown apparatuses. More or fewer apparatuses may alternatively be implemented or possessed. Each block shown in FIG. 6 may represent one apparatus, or may represent a plurality of apparatuses as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: acquire first point cloud data collected by a first vehicle-mounted laser radar and second point cloud data collected by a second vehicle-mounted laser radar, where the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar; perform ground estimation based on the first point cloud data; filter out a ground point in the second point cloud data according to the ground estimation result of the first point cloud data; and perform obstacle detection based on the second point cloud data after the ground point is filtered out.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor. For example, the processor may be described as: a processor comprising an acquiring unit, an estimating unit, a filtering-out unit and a detecting unit. Here, the names of these units do not in some cases constitute a limitation to such units themselves. For example, the first acquiring unit may alternatively be described as "a unit for acquiring first point cloud data collected by a first vehicle-mounted laser radar and second point cloud data collected by a second vehicle-mounted laser radar."

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting an obstacle, comprising:
   acquiring first point cloud data collected by a first vehicle-mounted laser radar and second point cloud data collected by a second vehicle-mounted laser radar, wherein the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar;
   performing ground estimation based on the first point cloud data;
   filtering out a ground point in the second point cloud data according to the ground estimation result of the first point cloud data; and
   performing obstacle detection based on the second point cloud data after the ground point is filtered out,
   wherein the performing ground estimation based on the first point cloud data comprises:
   dividing the first point cloud data into a plurality of preset spatial grids, performing downsampling on the first point cloud data in each grid, and fitting a ground in the grid to obtain a first ground fitting result;
   for each data point in a grid, calculating a distance between the data point and the fitted ground, using the data point as a new ground point in response to the distance being less than a threshold, and updating the first ground fitting result of the grid based on the new ground point to obtain a second ground fitting result;
   calculating an angle between grounds in adjacent grids, smoothing the angle in response to the angle being smaller than a preset angle, and updating the second ground fitting result to obtain a third ground fitting result; and
   obtaining the ground estimation result of the first point cloud data based on the third ground fitting result.

2. The method according to claim 1, wherein the filtering out a ground point in the second point cloud data according to the ground estimation result of the first point cloud data comprises:
   calculating a distance between a data point in the second point cloud data and the ground estimated based on the first point cloud data, and ascertaining a data point, of which a distance from the ground estimated based on the first point cloud data is less than a preset distance threshold, in the second point cloud data as the ground point; and
   filtering out the ground point in the second point cloud data.

3. The method according to claim 1, wherein the performing obstacle detection based on the second point cloud data after the ground point is filtered out comprises:
   fusing the first point cloud data and the second point cloud data after the ground point is filtered out, to perform the obstacle detection.

4. The method according to claim 1, wherein the second laser radar is a single-line laser radar.

5. An apparatus for detecting an obstacle, comprising:
   at least one processor; and
   a memory storing instructions, wherein the instructions when executed by the at least one processor, cause the at least one processor to perform operations, the operations comprising:

acquiring first point cloud data collected by a first vehicle-mounted laser radar and second point cloud data collected by a second vehicle-mounted laser radar, wherein the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar;

performing ground estimation based on the first point cloud data;

filtering out a ground point in the second point cloud data according to the ground estimation result of the first point cloud data; and performing obstacle detection based on the second point cloud data after the ground point is filtered out, wherein the performing ground estimation based on the first point cloud data comprises:

dividing the first point cloud data into a plurality of preset spatial grids, performing downsampling on the first point cloud data in each grid, and fitting a ground in the grid to obtain a first ground fitting result;

for each data point in a grid, calculating a distance between the data point and the fitted ground, using the data point as a new ground point in response to the distance being less than a threshold, and updating the first ground fitting result of the grid based on the new ground point to obtain a second ground fitting result;

calculating an angle between grounds in adjacent grids, smoothing the angle in response to the angle being smaller than a preset angle, and updating the second ground fitting result to obtain a third ground fitting result; and obtaining the ground estimation result of the first point cloud data based on the third ground fitting result.

6. The apparatus according to claim 5, wherein the filtering out a ground point in the second point cloud data according to the ground estimation result of the first point cloud data comprises:

calculating a distance between a data point in the second point cloud data and the ground estimated based on the first point cloud data, and ascertaining a data point, of which a distance from the ground estimated based on the first point cloud data is less than a preset distance threshold, in the second point cloud data as the ground point; and filtering out the ground point in the second point cloud data.

7. The apparatus according to claim 5, wherein the performing obstacle detection based on the second point cloud data after the ground point is filtered out comprises:

fusing the first point cloud data and the second point cloud data after the ground point is filtered out, to perform the obstacle detection.

8. The apparatus according to claim 5, wherein the second laser radar is a single-line laser radar.

9. A non-transitory computer readable medium, storing a computer program, wherein the program, when executed by a processor, causes the processor to perform operations, the operations comprising:

acquiring first point cloud data collected by a first vehicle-mounted laser radar and second point cloud data collected by a second vehicle-mounted laser radar, wherein the first vehicle-mounted laser radar and the second vehicle-mounted laser radar are mounted on a given autonomous driving vehicle, a height of the first vehicle-mounted laser radar from a ground is greater than a height of the second vehicle-mounted laser radar from the ground, and a number of wiring harnesses of the first vehicle-mounted laser radar is greater than a number of wiring harnesses of the second vehicle-mounted laser radar;

performing ground estimation based on the first point cloud data;

filtering out a ground point in the second point cloud data according to the ground estimation result of the first point cloud data; and performing obstacle detection based on the second point cloud data after the ground point is filtered out, wherein the performing ground estimation based on the first point cloud data comprises:

dividing the first point cloud data into a plurality of preset spatial grids, performing downsampling on the first point cloud data in each grid, and fitting a ground in the grid to obtain a first ground fitting result for each data point in a grid, calculating a distance between the data point and the fitted ground, using the data point as a new ground point in response to the distance being less than a threshold, and updating the first ground fitting result of the grid based on the new ground point to obtain a second ground fitting result;

calculating an angle between grounds in adjacent grids, smoothing the angle in response to the angle being smaller than a preset angle, and updating the second ground fitting result to obtain a third ground fitting result; and obtaining the ground estimation result of the first point cloud data based on the third ground fitting result.

10. The non-transitory computer readable medium according to claim 9, wherein the filtering out a ground point in the second point cloud data according to the ground estimation result of the first point cloud data comprises:

calculating a distance between a data point in the second point cloud data and the ground estimated based on the first point cloud data, and ascertaining a data point, of which a distance from the ground estimated based on the first point cloud data is less than a preset distance threshold, in the second point cloud data as the ground point; and filtering out the ground point in the second point cloud data.

11. The non-transitory computer readable medium according to claim 9, wherein the performing obstacle detection based on the second point cloud data after the ground point is filtered out comprises:

fusing the first point cloud data and the second point cloud data after the ground point is filtered out, to perform the obstacle detection.

12. The non-transitory computer readable medium according to claim 9, wherein the second laser radar is a single-line laser radar.

* * * * *